(12) United States Patent  
Shin

(10) Patent No.: US 6,650,532 B2  
(45) Date of Patent: Nov. 18, 2003

(54) MOBILE COMPUTER HAVING AN EXTERNAL ANTENNA AND A METHOD FOR WIRELESS COMMUNICATION BY A MOBILE COMPUTER

(75) Inventor: Jeong-Karb Shin, Kyunggi-do (KR)

(73) Assignee: Samsung Electronics Co., Ltd., Suwon (KR)

( * ) Notice: Subject to any disclaimer, the term of this patent is extended or adjusted under 35 U.S.C. 154(b) by 165 days.

(21) Appl. No.: 09/902,714

(22) Filed: Jul. 12, 2001

(65) Prior Publication Data

US 2002/0101706 A1 Aug. 1, 2002

(30) Foreign Application Priority Data

Jan. 31, 2001 (KR) .......................................... 2001/4577

(51) Int. Cl.[7] ................................................. H04B 1/38
(52) U.S. Cl. .................... 361/683; 361/686; 364/708.1; 439/928
(58) Field of Search ......................... 361/683, 681–682, 361/684, 686, 728–730, 724–727; 364/708.1, 705.01, 705.05; 439/928; 455/74, 550, 556–558, 90, 575, 128–129, 267, 347, 351; 343/702, 715, 872, 900, 901

(56) References Cited

U.S. PATENT DOCUMENTS

| | | | | |
|---|---|---|---|---|
| 5,440,449 A | * | 8/1995 | Scheer ........................ | 361/686 |
| 5,828,341 A | * | 10/1998 | Delamater .................. | 343/702 |
| 5,913,174 A | * | 6/1999 | Casarez et al. ............. | 455/557 |
| 6,262,684 B1 | * | 7/2001 | Stewart et al. .............. | 343/702 |
| 6,285,328 B1 | * | 9/2001 | Masaki et al. .............. | 343/702 |
| 6,380,898 B1 | * | 4/2002 | Moore et al. ............... | 343/702 |

* cited by examiner

*Primary Examiner*—Michael Datskovsky  
(74) *Attorney, Agent, or Firm*—Robert E. Bushnell, Esq.

(57) ABSTRACT

A mobile computer includes an external antenna which is able to wirelessly communicate data with peripheral devices. The mobile computer includes a main body, a display portion connected with the main body, a wireless communication module disposed in the main body, an antenna for transmitting and receiving data from the wireless communication module, contact means for connecting electrically the antenna with the wireless communication module, and mounting means for mounting the antenna on the display portion.

29 Claims, 7 Drawing Sheets

MOBILE COMPUTER HAVING AN EXTERNAL ANTENNA AND A METHOD FOR WIRELESS COMMUNICATION BY A MOBILE COMPUTER

CLAIM OF PRIORITY

This application makes reference to, incorporates the same herein, and claims all benefits accruing under 35 U.S.C. §119 from my application A PORTABLE COMPUTER HAVING EXTERNAL ANTENNA filed with the Korean Industrial Property Office on Jan. 31, 2001 and there duly assigned Serial No. 4577/2001.

BACKGROUND OF THE INVENTION

1. Field of the Invention

The present invention relates to a mobile computer, and more particularly to a mobile computer having an external antenna which is able to wirelessly communicate with peripheral devices.

2. Related Art

Of mobile computers, a portable computer which is most widely used has many hardware devices and wires incorporated in a small space. Also, peripheral devices such as a keyboard, a mouse, a speaker, a printer, a personal computer (PC) camera, etc. are typically connected to the portable computer by means of cables. Accordingly, there is a problem that an area in the vicinity of the portable computer is usually always complicated and not desirable in appearance.

Recently, wireless data communication techniques which are able to wirelessly communicate data between a computer and peripheral devices have been developed. Of the wireless data communication techniques, typical examples of such techniques used in a short distance wireless data communication are infrared data association (IrDA), wireless LAN (IEEE802.11), shared wireless access protocol (SWAP) which is preparing a standard specification by "HomeRF" founded in March, 1998, bluetooth, etc., for example.

Of the above mentioned techniques, the bluetooth technique has several advantages compared with the other techniques. In case of applying the bluetooth technique, all digital devices including a computer, a keyboard, a mouse, a printer, a scanner etc., for example, can be wirelessly connected with each other and wirelessly operated.

When a bluetooth module is used in a portable computer, an antenna for transmitting and receiving data is required. However, as the portable computer is minimized as to the space it occupies and is lightened for convenience of mobility, it is very difficult to obtain space for disposing the antenna in the portable computer.

SUMMARY OF THE INVENTION

It is an object, among other objects, of the present invention to provide an improved mobile computer on which and from which can be easily mounted and separated an external antenna.

The above and other objects are provided, according to the present invention, by a mobile computer including an external antenna which is able to wirelessly communicate with peripheral devices. The mobile computer of the present invention includes a main body, a display portion or display device connected with the main body, a wireless communication module disposed in the main body, an antenna for transmitting data to and receiving data from the wireless communication module, contact means for electrically connecting the antenna with the wireless communication module, and mounting means for mounting the antenna on the display portion or display device.

In the present invention, the wireless communication module is desirably any of a bluetooth module and an infrared data association (IrDA)module, for example.

In the present invention, the contact means includes a first contact terminal connected electrically to the wireless communication module and exposed at a side of the display portion, and a second contact terminal disposed on the antenna for contact with the first contact terminal. The second contact terminal includes an elastic spring or is elastic spring shaped terminal. Also, the wireless communication module is connected to the first contact terminal by means of a coaxial cable, for example.

In the present invention, the mounting means includes at least one groove formed on a side of the display portion adjacent to the first contact terminal, and at least one projection formed on the antenna to be respectively inserted into the at least one groove. The projection includes a hook or is a hook shaped projection.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference numerals indicate the same or similar components, and wherein.

DETAILED DESCRIPTION OF PREFERRED EMBODIMENTS

The present invention now will be described more fully hereinafter with reference to the accompanying drawings, in which preferred embodiments of the invention are shown. Like reference numbers refer to like elements throughout the following discussion of the preferred embodiments.

Figure 1:
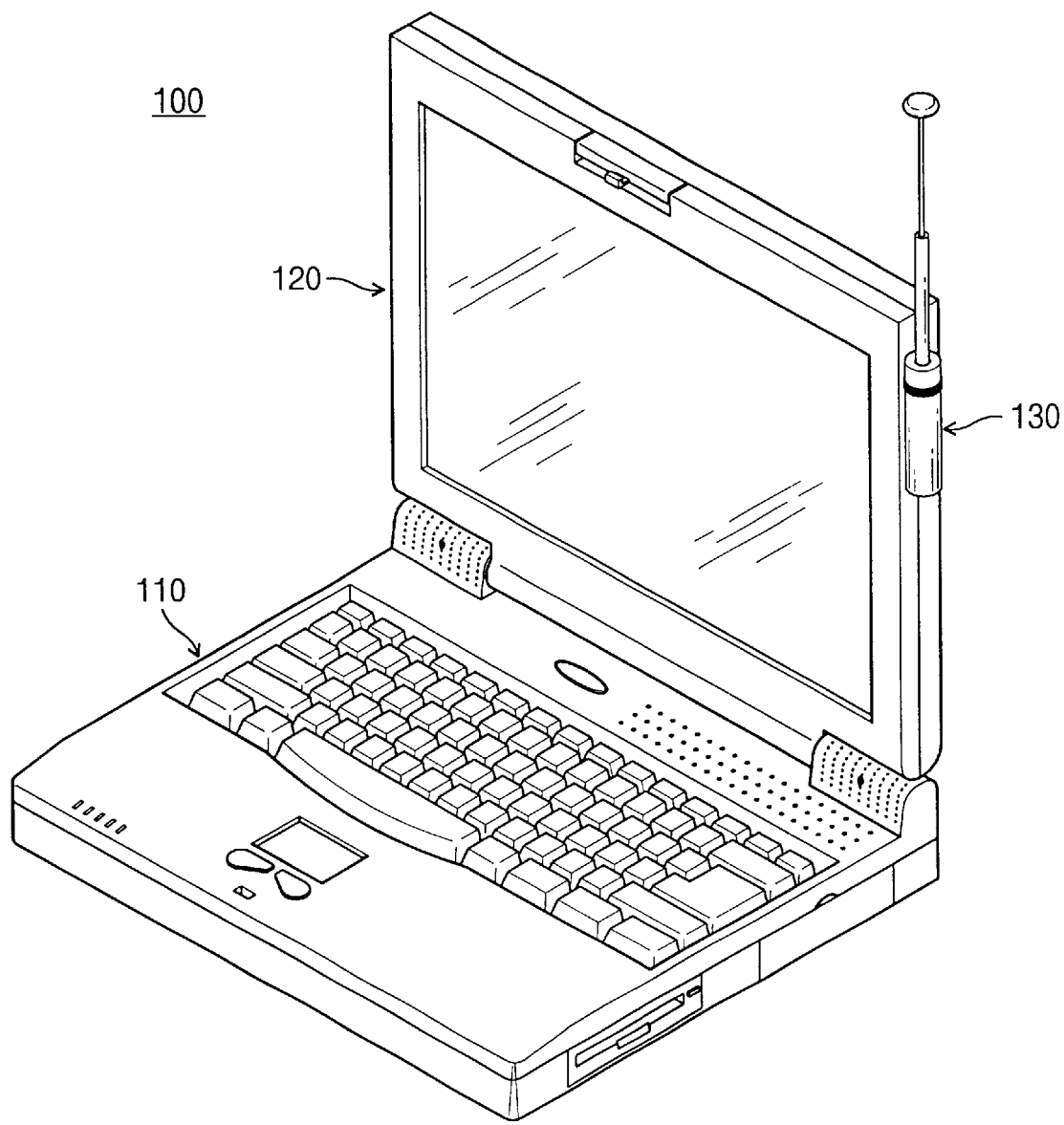
FIG. 1 is a perspective view illustrating a portable computer in accordance with a preferred embodiment of the present invention.
Figure 2:
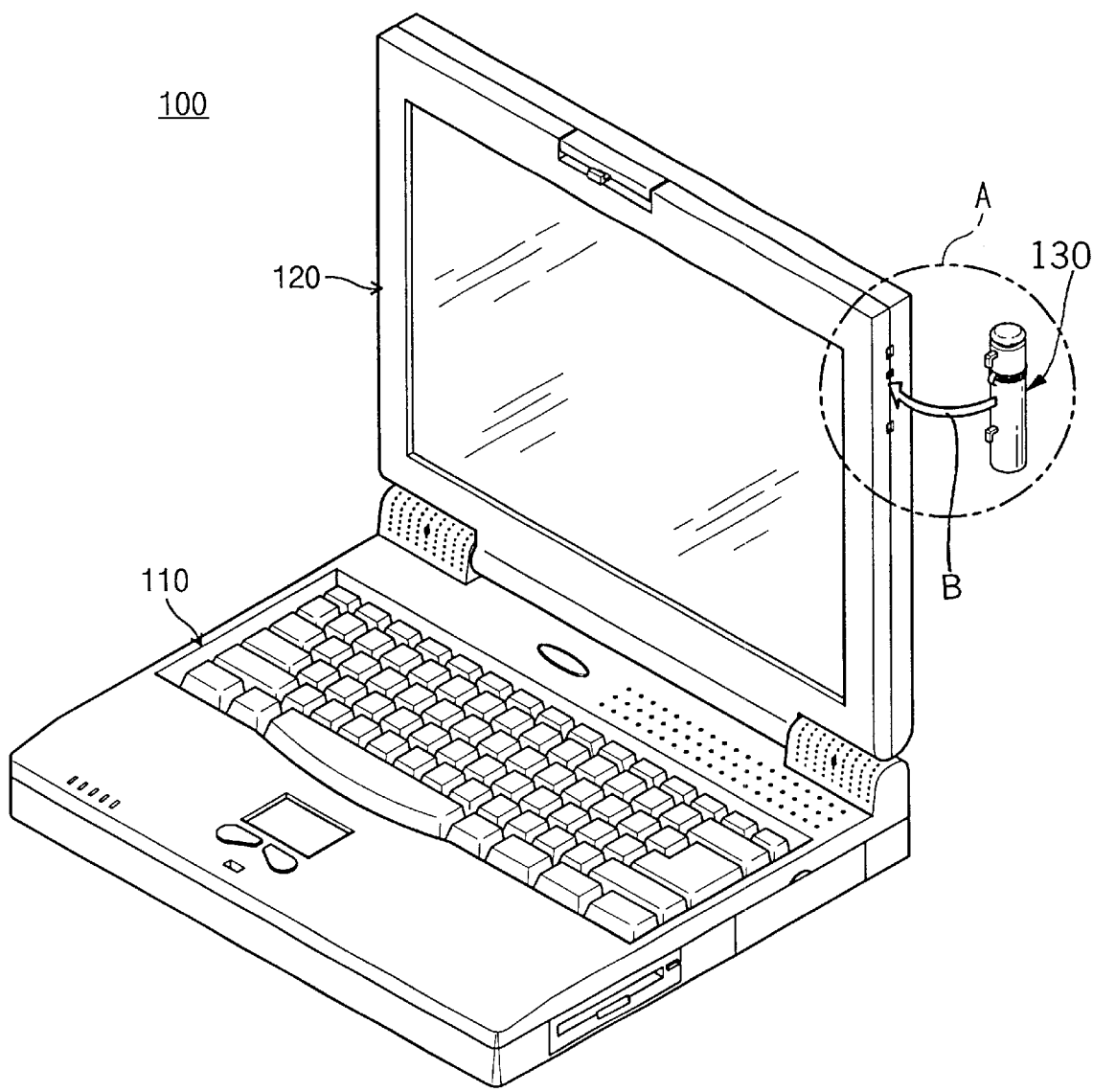
FIG. 2 a perspective view of the portable computer in accordance with the preferred embodiment of the present invention of FIG. 1 illustrating a state in which an external antenna is separated from the portable computer.
Figure 3:
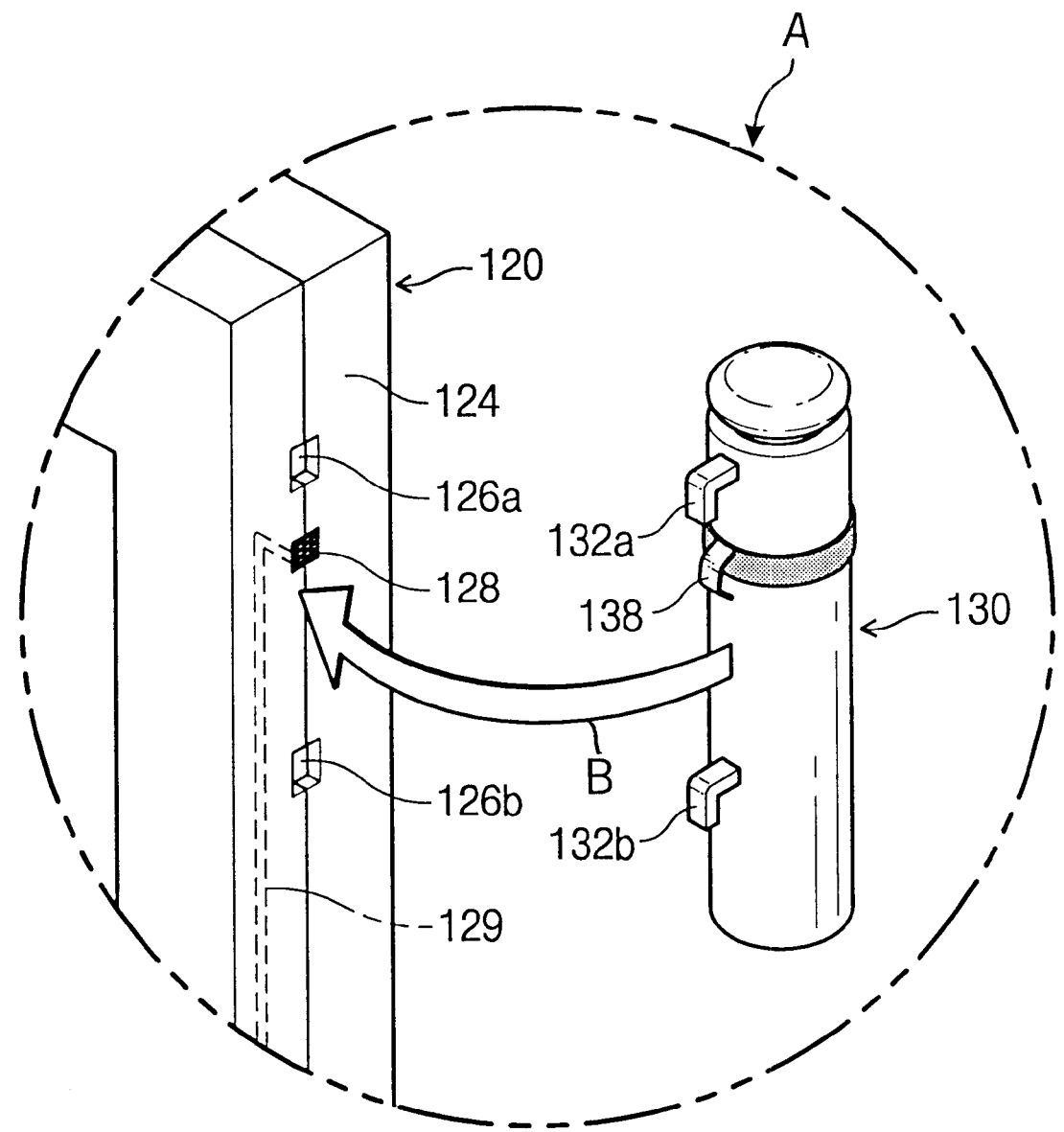
FIG. 3 is an enlarged view of an "A" portion of the portable computer illustrated in FIG. 2.
Figure 4:
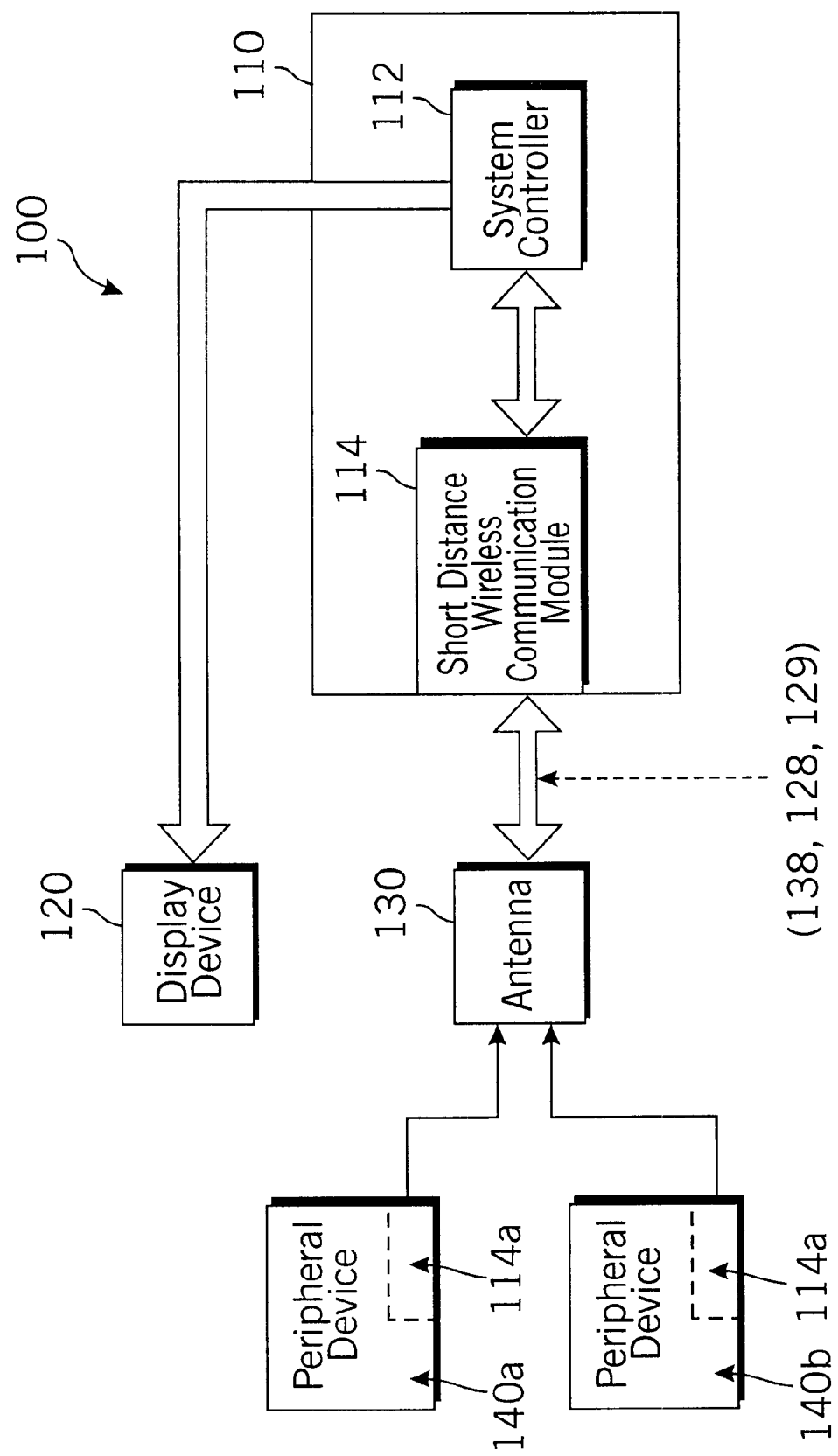
FIG. 4 is a block diagram illustrating the portable computer of FIGS. 1 and 2 in accordance with the preferred embodiment of the present invention.

Referring now to one embodiment of a portable computer according to the present invention of FIGS. 1 through 5B, FIG. 1 is a perspective view of a mobile computer 100, such as portable computer 100, in accordance with a preferred embodiment of the present invention. FIG. 2 a perspective view of the portable computer 100 in accordance with a preferred embodiment of the present invention showing a state in which an external antenna is separated from the portable computer 100. FIG. 3 is an enlarged view of an "A" portion of the portable computer 100 shown in FIG. 2. FIG. 4 is a block diagram of the portable computer 100 in accordance with a preferred embodiment of the present invention.

Referring now to FIG. 1 through FIG. 5B, the portable computer 100 in accordance with a preferred embodiment of the present invention includes a computer main body 110, a display device or display portion 120, an external antenna 130, a contact means for selectively electrically connecting the external antenna 130 with a wireless communication module in the computer main body 110 and a mounting means for selectively mounting the external antenna 130 on the display portion or display device 120. The portable computer 100 is one of example of a typical mobile computer to which the present invention is applicable. It is noted that in the specification, the term mobile computer can include various mechanical apparatus to which the present invention is applicable, such as a laptop or notebook personal computer (PC), a palmtop PC, a handheld PC, a personal digital assistant, a terminal, etc., for example.

Referring to FIG. 4, the computer main body 110 desirably includes a short distance wireless communication module 114, such as a bluetooth module or an infrared data association module, for example, in the computer main body 110. The short distance wireless communication module 114 is used for wireless communication of the portable or mobile computer 100 with external devices, such as peripheral devices, with examples of peripheral devices being a keyboard, mouse, printer, scanner, etc. A system controller 112 transmits and receives data to and from peripheral devices, such as peripheral devices 140a, 140b, through the short distance wireless communication module 114. The short distance wireless communication module 114 is electrically connected to the external antenna 130. Also, the computer main body 110 includes typical components of a general computer system, such as central processing unit (CPU), random access memory (RAM), memory devices, storage devices, etc. It is noted that while the present invention is explained as using the bluetooth module as the short distance wireless communication module 114, the portable computer 100 according to the present invention can also use other short distance wireless communication modules 114, such an IrDA module, a wireless LAN (IEEE802.11) module, a SWAP module, etc., for example.

Continuing with reference to FIGS. 1 through 5B, the display device or display portion 120 of the portable computer 100 includes a suitable display device, such as a ST or thin film transistor (TFT) liquid crystal display (LCD) device, or a plasma display device, for example. The external antenna 130 is disposed on the display device 120 to wirelessly transmit and receive data to and from devices, such as peripheral devices 140a, 140b, having short distance wireless communication modules 114a for wireless communication, such as bluetooth modules, as shown in the drawings, particularly in FIG. 4. Also, as previously mentioned, short distance wireless communication modules 114a, other than bluetooth modules, can also be used for the wireless transmission and reception of data, such as infrared data association modules, for example. The external antenna 130 is fabricated to have a suitable size to support the used frequency band for the data to be wirelessly transmitted and received.

Continuing with reference to FIGS. 1 through 5B, particularly the "A" portion of FIGS. 2, 3, 5A and 5B, the external antenna 130 of the portable computer 100 is detachably fixed on the display device 120 by means of the previously mentioned mounting means. In this regard, the display device 120 has a mounting surface 124 on which the external antenna 130 is mounted, the mounting of the external antenna 130 to display device 120 being indicated by the arrow B in FIGS. 2 and 3. The mounting means includes a first groove 126a and a second groove 126b formed on the mounting surface 124 of the display device 120, and includes a first hook 132a and a second hook 132b formed on the external antenna 130. Thus, the external antenna 130 can be detachably mounted on the mounting surface 124 of the display device 120 by inserting the first and second hooks 132a, 132b into the first and second grooves 126a, 126b, respectively. Alternatively, the mounting means can include any other structure which is able to mount the external antenna 130 on the mounting surface 124 of the display device 120, such as a suitable clip or fastener arrangement, for example.

The external antenna 130 is electrically connected with the short distance wireless communication module 114 by means of the contact means. The contact means has a first contact terminal 128 exposed at the mounting surface 124 of the display device 120, and a second contact terminal 138 disposed on the external antenna 130. The first contact terminal 128 is electrically connected to the short distance wireless communication module 114 through a coaxial cable 129. The second contact terminal 138 has an elastic spring shape so as to be stably in contact with the first contact terminal 128.

Figure 5A:
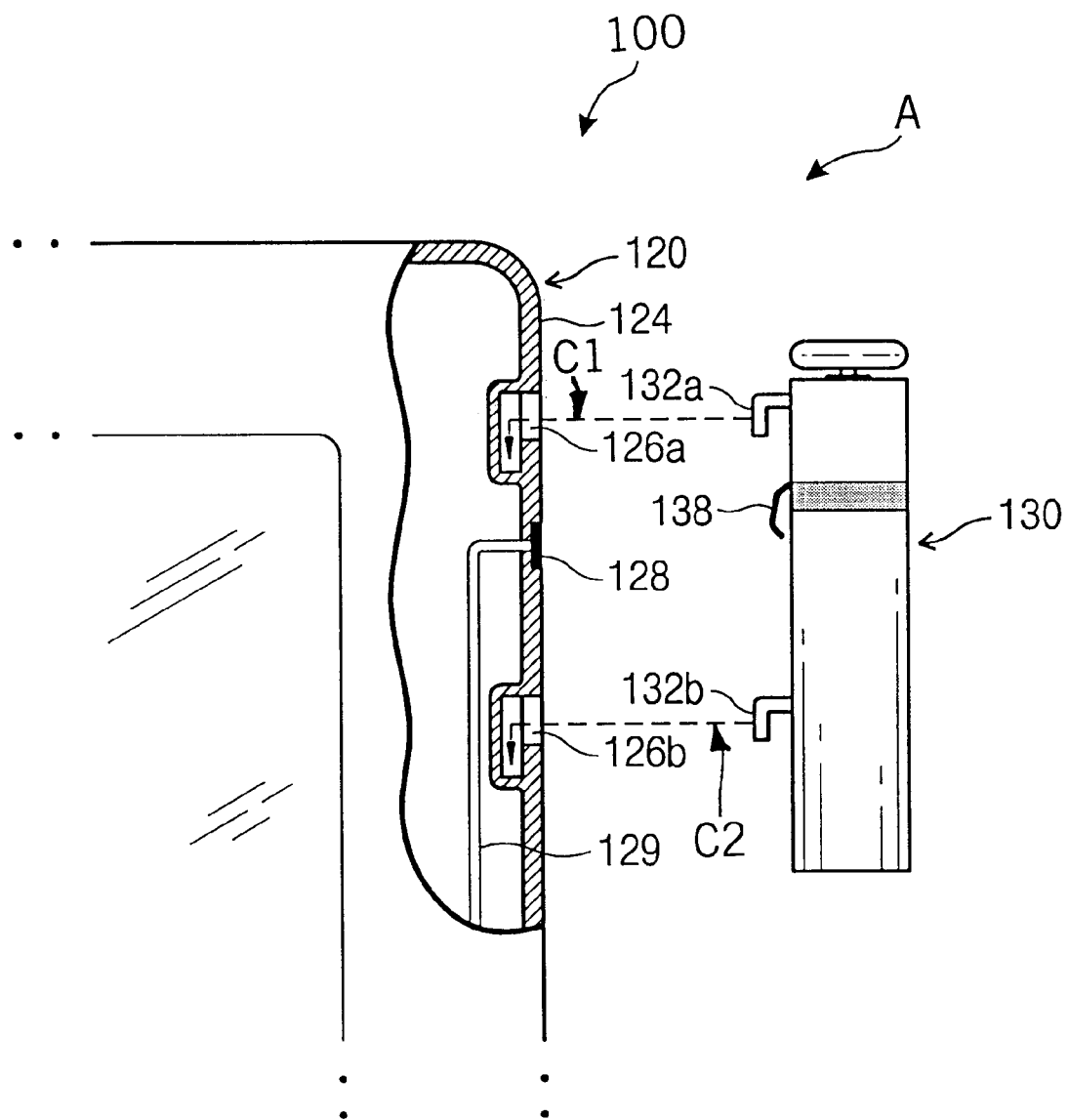
FIG. 5A and FIG. 5B are partial cross-section views illustrating the process of mounting the external antenna of the portable computer of FIGS. 1 and 2 in accordance with the preferred embodiment of the present invention.
Figure 5B:
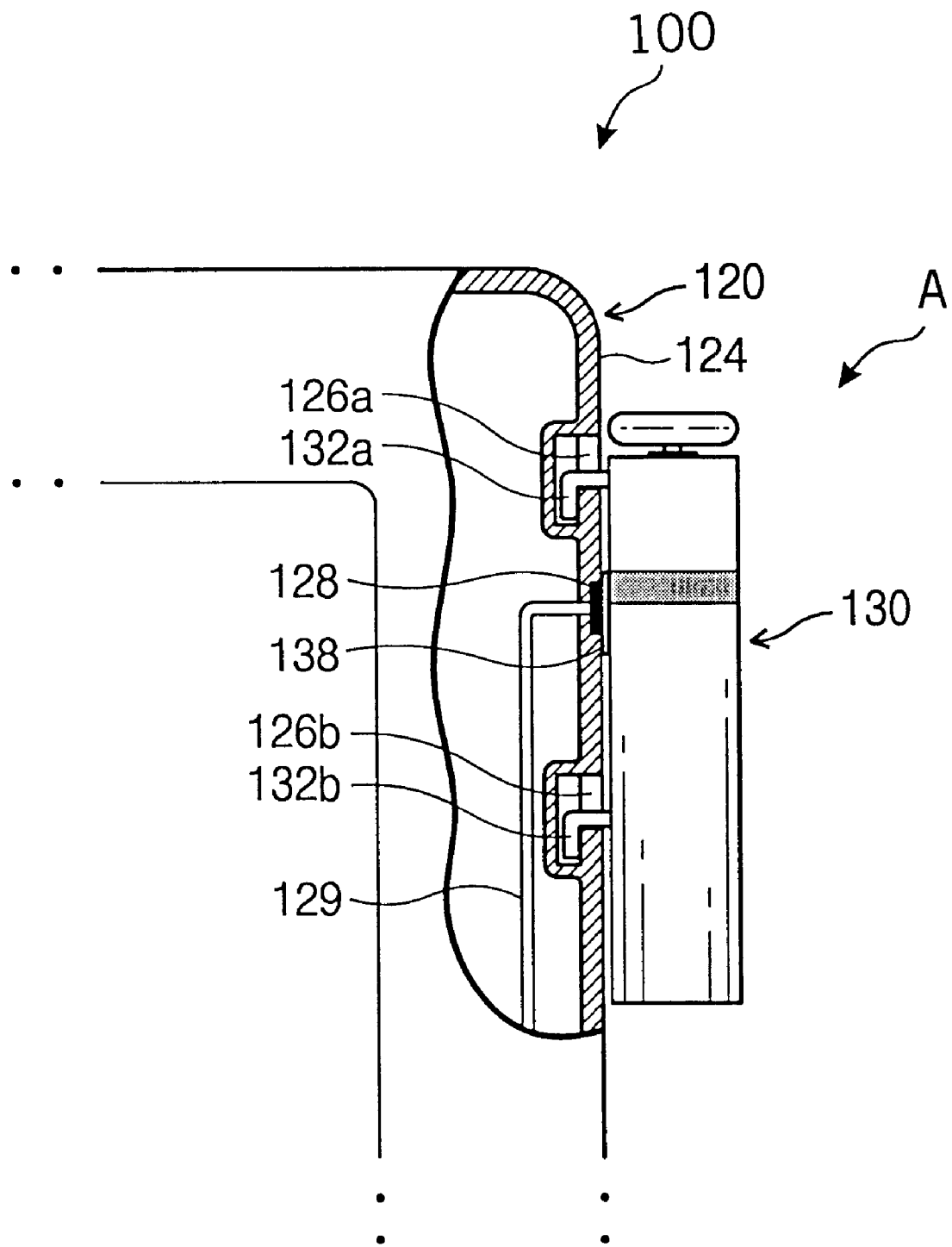

Referring now to FIG. 5A, and FIG. 5B, a process of mounting the external antenna 130 of the portable computer 100 to portable computer 100 is illustrated. As shown in FIGS. 5A and 5B, as the first and second hooks 132a, 132b are each inserted into the first and second grooves 126a, 126b in the direction of the arrows C1 and C2, respectively, the external antenna 130 is mounted on the mounting surface 124 of the display device 120. Upon insertion of the first and second hooks 132a, 132b into the respective first and second grooves 126a, 126b, the second contact terminal 138 is urged to be elastically in contact with the first contact terminal 128. As a result, the first contact terminal 128 is connected electrically with the second contact terminal 138.

Figure 6:
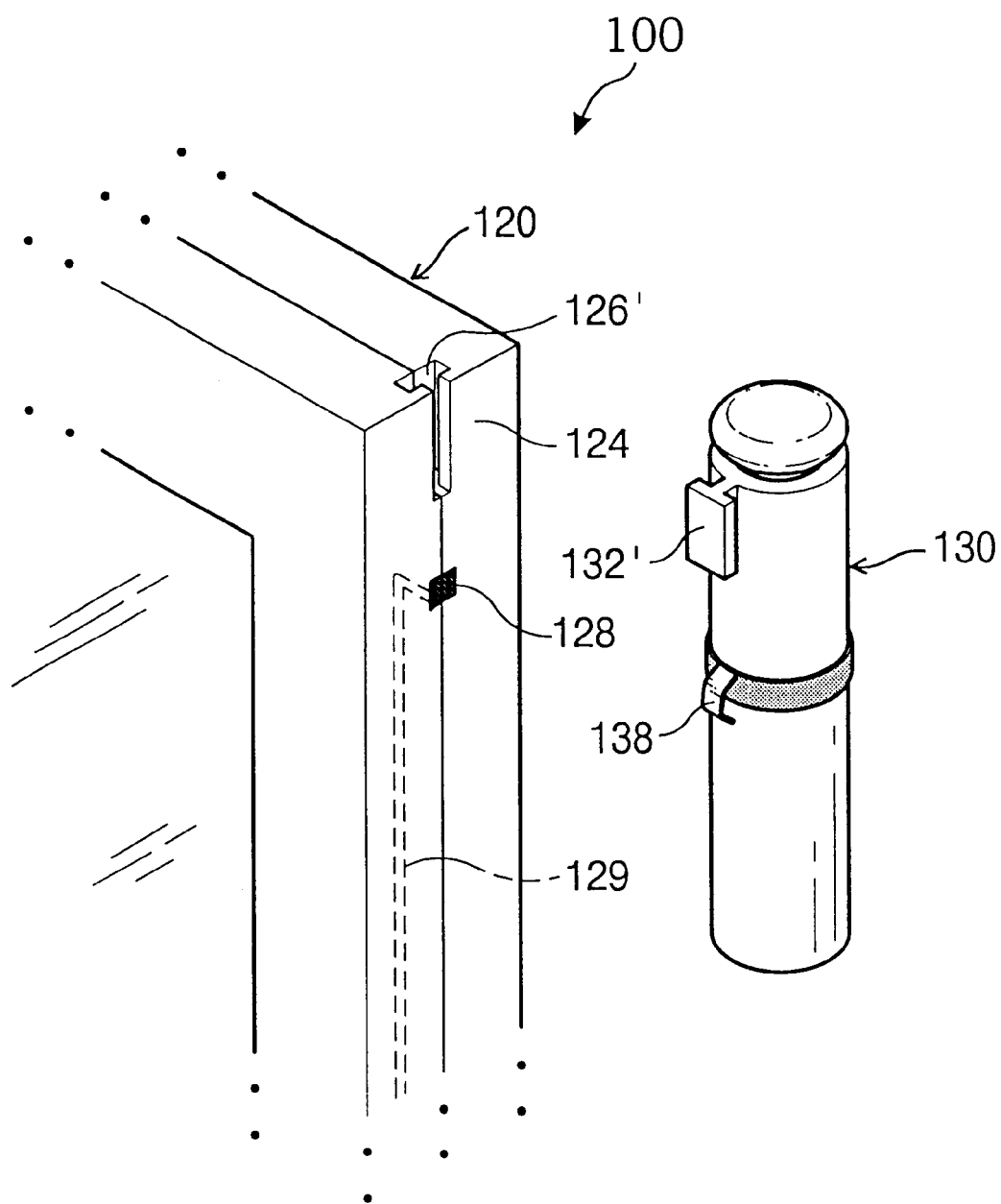
FIG. 6 is a partial perspective view illustrating another example of a mounting means of a portable computer in accordance with the present invention.

Continuing with reference to FIG. 6, FIG. 6 is a partial perspective view of another example of another mounting means for mounting external antenna 130 of the portable computer 100 to the portable computer 100 of the present invention. As illustrated in FIG. 6, the mounting means includes a guide groove 126' formed on a mounting surface 124 of the display device 120, and a projection 132' formed on the external antenna 130. The projection 132' has a shape so as to be inserted and engaged in and with the guide groove 126', the projection 132' and the guide groove 126' each being of a "T" shape, for example. Thus, the external antenna 130 is mounted on the mounting surface 124 of the display device 120 by inserting the projection 132' into the guide groove 126' and then pulling down the external antenna 130 to engage the projection 132' with the guide groove 126' to support the external antenna 130 on the portable computer 100. When the external antenna 130 is mounted on the mounting surface 124 of the display device 120, the first contact terminal 128 is electrically connected with the second contact terminal 138 and thereby the external antenna 130 is connected to the short distance wireless communication module 114 through the coaxial cable 129.

As apparent from the foregoing description, it can be appreciated that the present invention provides a mobile computer, such as a portable computer, including a mounting means for mounting an external antenna and a contact means for connecting electrically the external antenna to a wireless communication module, thereby advantageously enabling mounting and separating easily the external antenna from the mobile computer, such as a portable computer.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A mobile computer for wirelessly communicating data, comprising:
   a main body;
   a display device connected to said main body;
   a wireless communication module disposed in said main body for wireless communication;
   an antenna for transmitting data to and receiving data from said wireless communication module;
   contact means for selectively connecting electrically said antenna with said wireless communication module; and
   mounting means for selectively mounting said antenna on said display device;
   said contact means including:
      a first contact terminal connected electrically to said wireless communication module, said first contact terminal being disposed in, and exposed at a side of, said display device; and
      a second contact terminal disposed on said antenna for contact with said first contact terminal, said second contact terminal being in the shape of an elastic spring.

2. The mobile computer according to claim 1, said wireless communication module being any of a bluetooth module and an infrared data association module.

3. The mobile computer according to claim 1, said wireless communication module being a bluetooth module.

4. The mobile computer according to claim 1, said wireless communication module being connected to said first contact terminal by means of a coaxial cable.

5. A mobile computer for wirelessly communicating data, comprising:
   a main body;
   a display device connected to said main body;
   a wireless communication module disposed in said main body for wireless communication;
   an antenna for transmitting data to and receiving data from said wireless communication module;
   contact means for selectively connecting electrically said antenna with said wireless communication module; and
   mounting means for selectively mounting said antenna on said display device;
   said mounting means including:
      at least one groove formed on said side of said display device adjacent to said first contact terminal; and
      at least one projection formed on said antenna for insertion into a corresponding said groove;
   said at least one groove and said at least one projection each being T shaped.

6. The mobile computer according to claim 5, said at least one projection being in the shape of a hook.

7. The mobile computer according to claim 6, said wireless communication module being any of a bluetooth module and an infrared data association module.

8. The mobile computer according to claim 5, said wireless communication module being any of a bluetooth module and an infrared data association module.

9. The mobile computer according to claim 1, said wireless communication module being connected to said first contact terminal by means of a coaxial cable.

10. The mobile computer according to claim 1, said mounting means including:
    at least one groove formed on said side of said display device adjacent to said first contact terminal; and
    at least one projection formed on said antenna for insertion into a corresponding said groove.

11. The mobile computer according to claim 10, said at least one projection being in the shape of a hook.

12. The mobile computer of claim 10, said at least one groove being a guide groove for receiving and for engaging with a corresponding said projection.

13. The mobile computer of claim 12, said guide groove and a corresponding said projection for receiving said guide groove each being T shaped.

14. The mobile computer according to claim 10, said wireless communication module being any of a bluetooth module and an infrared data association module.

15. The mobile computer according to claim 10, said wireless communication module being connected to said first contact terminal by means of a coaxial cable.

16. The mobile computer according to claim 1, said mobile computer wirelessly communicating with at least one peripheral device.

17. The mobile computer according to claim 16, each said at least one peripheral device including a wireless communication module for wirelessly communicating with said mobile computer.

18. The mobile computer according to claim 17, said wireless communication module of each said at least one peripheral device and said wireless communication module of said mobile computer each being any of a bluetooth module and an infrared data association module.

19. The mobile computer according to claim 17, said wireless communication module of each said at least one peripheral device and said wireless communication module of said mobile computer each being a bluetooth module.

20. A method for wirelessly communicating data with a mobile computer, comprising the steps of:
    disposing a wireless communication module in a main body of said mobile computer;
    selectively mounting an antenna on a display device of said mobile computer;
    selectively connecting electrically said antenna with said wireless communication module; and
    transmitting data to and receiving data from said wireless communication module through said antenna;
    wherein said connecting step comprises disposing a first contact terminal in said display device, exposing said first contact terminal at a side of said display device, disposing a second contact terminal on said antenna, and establishing electrical contact between said first contact terminal and said second contact terminal.

21. The method according to claim 20, further comprising the step of using any of a bluetooth module and an infrared data association module as said wireless communication module.

22. The method according to claim 20, further comprising the step of:
    wirelessly communicating with a peripheral device using said wireless communication module of said mobile computer.

23. The method according to claim 22, further comprising the step of providing said peripheral device with a wireless communication module for wirelessly communicating with said mobile computer.

24. The method according to claim 23, said wireless communication module of said peripheral device and said wireless communication module of said mobile computer each being any of a bluetooth mobile and an infrared data association module.

25. A method for wirelessly communicating data with a mobile computer, comprising the steps of:
    disposing a wireless communication module in a main body of said mobile computer;
    selectively mounting an antenna on a display device of said mobile computer;
    selectively connecting electrically said antenna with said wireless communication module; and
    transmitting data to and receiving data from said wireless communication module through said antenna;
    wherein said mounting step comprises forming at least one groove on a side of said display device adjacent to said first contact terminal, and forming at least one projection on said antenna for insertion into a corresponding said groove, said at least one groove and said at least one projection each being T-shaped.

26. The method according to claim 25, further comprising the step of using any of a bluetooth module and an infrared data association module as said wireless communication module.

27. The method according to claim 25, further comprising the step of:
    wirelessly communicating with a peripheral device using said wireless communication module of said mobile computer.

28. The method according to claim 27, further comprising the step of providing said peripheral device with a wireless communication module for wirelessly communicating with said mobile computer.

29. The method according to claim 28, said wireless communication module of said peripheral device and said wireless communication module of said mobile computer each being any of a bluetooth mobile and an infrared data association module.

* * * * *